(12) United States Patent
Yu et al.

(10) Patent No.: US 11,604,797 B2
(45) Date of Patent: Mar. 14, 2023

(54) INFERRING JOINS FOR DATA SETS

(71) Applicant: MicroStrategy Incorporated, Vienna, VA (US)

(72) Inventors: Nannan Yu, Fairfax, VA (US); Mohamed Diakite Pineda, Oakton, VA (US); Ren-Jay Huang, Leesburg, VA (US)

(73) Assignee: MicroStrategy Incorporated, Vienna, VA (US)

( * ) Notice: Subject to any disclaimer, the term of this patent is extended or adjusted under 35 U.S.C. 154(b) by 384 days.

(21) Appl. No.: 16/684,572

(22) Filed: Nov. 14, 2019

(65) Prior Publication Data
US 2021/0149896 A1   May 20, 2021

(51) Int. Cl.
| | | |
|---|---|---|
| *G06F 16/24* | (2019.01) | |
| *G06F 16/2455* | (2019.01) | |
| *G06F 17/16* | (2006.01) | |
| *G06F 17/18* | (2006.01) | |
| *G06K 9/62* | (2022.01) | |

(52) U.S. Cl.
CPC .......... *G06F 16/2456* (2019.01); *G06F 17/16* (2013.01); *G06F 17/18* (2013.01); *G06K 9/6215* (2013.01)

(58) Field of Classification Search
CPC ....... G06F 16/2456; G06F 17/16; G06F 17/18
See application file for complete search history.

(56) References Cited

U.S. PATENT DOCUMENTS

| | | |
|---|---|---|
| 6,721,754 B1 | 4/2004 | Hurst et al. |
| 7,162,469 B2 | 1/2007 | Anonsen et al. |
| 7,644,361 B2 | 1/2010 | Wu et al. |
| 8,001,109 B2 | 8/2011 | Lohman et al. |
| 8,364,528 B2 | 1/2013 | Selinger et al. |
| 8,583,524 B2 | 11/2013 | Selinger et al. |
| 9,507,824 B2 | 11/2016 | Young et al. |

(Continued)

OTHER PUBLICATIONS

Jim Frost, How t-Tests Work: 1-sample, 2-sample, and Paired t-Tests, Apr. 7, 2017, https://statisticsbyjim.com/hypothesis-testing/t-tests-1-sample-2-sample-paired-t-tests/, pp. 1-8 (Year: 2017).*

(Continued)

*Primary Examiner* — Mohammad S Rostami
(74) *Attorney, Agent, or Firm* — Fish & Richardson P.C.

(57) ABSTRACT

Methods, systems, and apparatus, including computer programs encoded on computer-storage media, for inferring joins for data sets. In some implementations, a first data table and a second data table are identified. A first subset of records are selected from the first data table and a second subset of records are selected from the second data table. For fields of the first subset and the second subset, sets of feature values are generated indicating characteristics of the data in the fields. Based on the sets of feature values, one or more similarity score are determined, with each similarity score indicating a similarity of a column in the first data table with respect to a column in the second data table. Based on the one or more similarity scores, data indicating a recommendation to join one or more columns of the first data table with one or more columns of the second data table is provided for output by a computing device.

18 Claims, 6 Drawing Sheets

(56) References Cited

U.S. PATENT DOCUMENTS

| | | | |
|---|---|---|---|
| 2016/0055205 A1* | 2/2016 | Jonathan | G06F 16/2456 707/714 |
| 2016/0092474 A1 | 3/2016 | Stojanovic et al. | |
| 2016/0092494 A1* | 3/2016 | Kabra | G06F 16/215 707/692 |
| 2016/0140116 A1* | 5/2016 | Li | G06F 16/214 707/609 |
| 2018/0075104 A1* | 3/2018 | Oberbreckling | G06F 16/2456 |
| 2018/0075115 A1* | 3/2018 | Murray | G06F 16/248 |
| 2019/0102438 A1* | 4/2019 | Murray | G06F 16/221 |
| 2019/0129959 A1* | 5/2019 | Jagwani | G06F 16/1727 |
| 2019/0138538 A1* | 5/2019 | Stojanovic | G06F 16/215 |
| 2021/0034618 A1* | 2/2021 | Lu | G06F 16/2456 |

OTHER PUBLICATIONS statisticshowto.com [online], "T Test (Student's T-Test): Definition and Examples" retrieved on Jun. 2, 2020, retrieved from URL <https://www.statisticshowto.com/probability-and-statistics/t-test/>, May 10, 2019, 8 pages.

Xiao et al., "Ed-Join: An Efficient Algorithm for Similarity Joins With Edit Distance Constraints" Proceedings of VLDB Endowment, Aug. 2008, 1(1):933-44.

\* cited by examiner

| VALUES 304 | FEATURES 302 | | | |
|---|---|---|---|---|
| | Length: | Numeric Probability: | Alphabetic Probability: | Symbol Probability: |
| 555-555-5555 | 12 | 10/12 | 0 | 2/12 |
| (555) 555-5555 | 13 | 10/13 | 0 | 3/13 |
| 123 Main St | 10 | 3/10 | 6/10 | 1/10 |

306 — 555-555-5555
308 — (555) 555-5555
310 — 123 Main St

402

Table A | Table B _130_ 408
| | Badge_ID | Badge_Name | Badge_Email | Badge_Phone | Badge_Title | Badge_Creation | Badge_Picture |
|---|---|---|---|---|---|---|---|
| ID | 0.0769 | 0 | 0 | 0 | 0 | 0 | 0 |
| NAME | 0 | 0.07692 | 0 | 0 | 0 | 0 | 0 |
| EMAIL | 0 | 0 | 0.07692 | 0 | 0 | 0 | 0 |
| PHONE | 0 | 0 | 0 | 0.07692 | 0 | 0 | 0 |
| TITLE | 0 | 0 | 0 | 0 | 0.16667 | 0 | 0 |

_120_ 406

404

Table A | Table B _130_ 408
| | Badge_ID | Badge_Name | Badge_Email | Badge_Phone | Badge_Title | Badge_Creation | Badge_Picture |
|---|---|---|---|---|---|---|---|
| ID | 0.77165 | 0.00000 | 0.00000 | 0.14286 | 0.00000 | 0.06365 | 0.00000 |
| NAME | 0.00000 | 0.94984 | 0.17428 | 0.01301 | 0.45694 | 0.14602 | 0.00003 |
| EMAIL | 0.00000 | 0.17438 | 0.98284 | 0.00036 | 0.27918 | 0.00000 | 0.00000 |
| PHONE | 0.14286 | 0.02096 | 0.00036 | 0.75694 | 0.03028 | 0.02537 | 0.21763 |
| TITLE | 0.00000 | 0.45694 | 0.30901 | 0.03028 | 0.98980 | 0.00000 | 0.00102 |

INFERRING JOINS FOR DATA SETS

TECHNICAL FIELD

The present specification relates to databases and data analytics.

BACKGROUND

Increasing amounts of data are generated every day. This data can be provided by numerous sources and can be organized in a number of ways. Due to the differences in the format and organization of data, it is often difficult to determine the relationships between portions of different data sets. For example, it can be difficult for computer systems to determine whether a join operation is appropriate for portions of two different data sets.

SUMMARY

In some implementations, a computer system is configured to assess data sets to efficiently evaluate data sets and determine whether a join operation is appropriate for portions of the data sets. For example, the system can use machine learning classification and other techniques to identify portions of different data sets that refer to the same or similar types of data. The technique can be used to efficiently predict and recommend portions of data sets (e.g., pairs of columns of tables in databases) that can be joined. The process can use a number of techniques that improve automated data analysis. When comparing portions of data sets, the process can sample the data to select only a small portion of non-homogeneous data (e.g., non-uniformly distributed data). For the selected data elements, the system can use heuristics, machine learning models, or other techniques to obtain feature values based on the data elements. Then, the feature values for data elements in a portion of a first data set (e.g., a column of a first data table) are compared with feature values for data elements in a portion of a second data set (e.g., a column of a second data table). Based on the similarity among the feature values, the system can determine a level of similarity between the portions of the data sets and whether a join of those portions would be appropriate.

In large data sets, it is often impractical to perform comprehensive comparisons of data elements. For example, for two tables with large numbers of records, it may require excessive amounts of time and computation to compare every value in each column in a first data set to every value in each column of a second data set. On the other hand, using sampling to reduce the number of values evaluated may reduce the likelihood of finding matching data and can increase inconsistency, as different selected groups may give very different comparison results. The present technique can achieve the efficiency of evaluating small, sampled sets of values while maintaining consistency and accuracy by comparing sets of feature values with other sets of feature values, rather than comparing values directly. For example, the feature values, being less specific than the full data element values from a database table, are more likely to find matches with other feature values than with strict matching of table entries. The feature values may nevertheless indicate key characteristics of the content of the table entries, e.g., indicating the length an entry, an amount of text content of an entry, an amount of numerical content of an entry, and so on. This can enable the process to find data set portions (e.g., columns) that represent matching data types, even if the columns include few or even no exact matches of values.

In one general aspect, a method performed by one or more computers includes: identifying a first data table and a second data table; selecting a first subset of records from the first data table and a second subset of records from the second data table; generating, for individual fields of the first subset and the second subset, a set of one or more feature values indicating characteristics of the data in the field; determining, based on the sets of feature values for the individual fields, one or more similarity scores each indicating similarity of a column of the first data table and a column of the second data table; and based on the one or more similarity scores, providing, for output by a computing device, data indicating a recommendation to join one or more columns of the first data table with one or more columns of the second data table.

In some implementations, generating the sets of feature values includes: generating first feature vectors each corresponding to a different feature type in a set of feature types, each of the first feature vectors having a feature value for each of a first set of fields that are in a first column of the first data table and are in the first subset; and generating second feature vectors each corresponding to a different feature type in the set of feature types, each of the second feature vectors having a feature value for each of a second set of fields that are in a second column of the second data table and are in the second subset. Determining one or more similarity scores includes: comparing each of the first feature vectors with a second feature vector that corresponds to the same feature type; and determining, based on the comparing, a similarity score that indicates a level of similarity of the first column of the first data table and the second column of the second data table.

In some implementations, the first data table includes first columns; the second data table includes second columns; and the method includes evaluating, for each of the first columns of the first data table with respect to each of the second columns of the second data table, whether a similarity score for the first column and the second column satisfies a minimum threshold level of similarity.

In some implementations, generating the set of one or more feature values indicating characteristics of the data in the field includes generating at least one of: a feature value based on a length of data in the field; a feature value based on a number of numeric digits in the field; a feature value based on a number of alphabetic characters in the field; or a feature value based on a number of characters that are non-numeric and non-alphabetic.

In some implementations, determining the one or more similarity scores each indicating similarity of a column of the first data table and a column of the second data table includes: for a pair of columns comprising a first column of the first data table and a second column of the second data table, performing a statistical hypothesis test using a first feature vector representing feature values for the first column and a second feature vector representing feature values for the second column; and generating a similarity score for the first column and the second column based on the results of the statistical hypothesis test.

In some implementations, the statistical hypothesis test is a T-test.

In some implementations, determining the one or more similarity scores includes determining a similarity score for a first column in the first data table with respect to a second column in the second data table includes: determining a first distribution of the feature values for the data in the fields in the first subset that are in the first column; determining a second distribution of the feature values for the data in the fields in the second subset that are in the second column; and comparing the first distribution with the second distribution; and determining a similarity score that indicates a level of similarity of a column of the first data table and a column of the second data table.

In some implementations, the method includes using the selected first subset of records from the first data table and the selected second subset of records from the second data table to evaluate similarity of each of the columns of the first data table with respect to each of the columns of the second data table. To evaluate different pairs of columns, the same sampled subsets may be used or different sampled subsets may be used.

In some implementations, determining the one or more similarity scores includes determining a similarity score for each column in the first data table with respect to each column in the second data table.

In some implementations, the method includes selecting a first column from the first data table and a second column from the second data table. Generating the feature values includes: generating, for each feature type of a set of multiple feature types, a first feature vector that includes a feature value for the data in the fields in the first subset that are in the first column in the first data table; and generating, for each feature type of the set of multiple feature types, a second feature vector that includes a feature value for the data in the fields in the second subset that are in the second column in the second data table. Determining the one or more similarity scores includes: evaluating each of the first feature vectors that correspond to the first column with respect to one of the second feature vectors that corresponds to the second column; and based on the evaluations, generating a similarity score for the first column and the second column.

In some implementations, comparing each of the first feature vectors that correspond to the first column with one of the second feature vectors that corresponds to the second column includes generating a score for each of the multiple feature types; and the similarity score for the first column and the second column is based on the respective scores for the multiple feature types.

In some implementations, evaluating each of the first feature vectors that correspond to the first column with respect to one of the second feature vectors that corresponds to the second column includes: determining, for the first column and the second column, a probability value for each feature type, each probability value being based on a different pair of feature vectors, where both feature vectors in each of the pairs of feature vectors corresponds to the same feature type.

In some implementations, determining the probability value for each feature type includes performing a statistical hypothesis test for a pair of feature vectors corresponding to the same feature type.

In some implementations, determining a probability value for each feature type includes: determining a magnitude of a difference between the feature vectors in a pair of feature vectors corresponding to the same feature type; and comparing the magnitude with a threshold.

In some implementations, the method includes determining that, for one of the first feature vectors or second feature vectors, that all values in the feature vector are the same or are within a threshold amount of each other.

In some implementations, the method includes introducing randomness to feature values in a first feature vector that correspond to the first column and to feature values in a second feature vector that corresponds to the second column.

Other embodiments of these and other aspects discussed herein include corresponding systems, apparatus, and computer programs encoded on computer storage devices, any or all of which may be configured to perform the actions of the methods. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

FIG. 3 is a table showing examples of features for data table values.

FIG. 4 is a diagram depicting two similarity score matrices.

Like reference numbers and designations in the various drawings indicate like elements.

DETAILED DESCRIPTION

Figure 1:
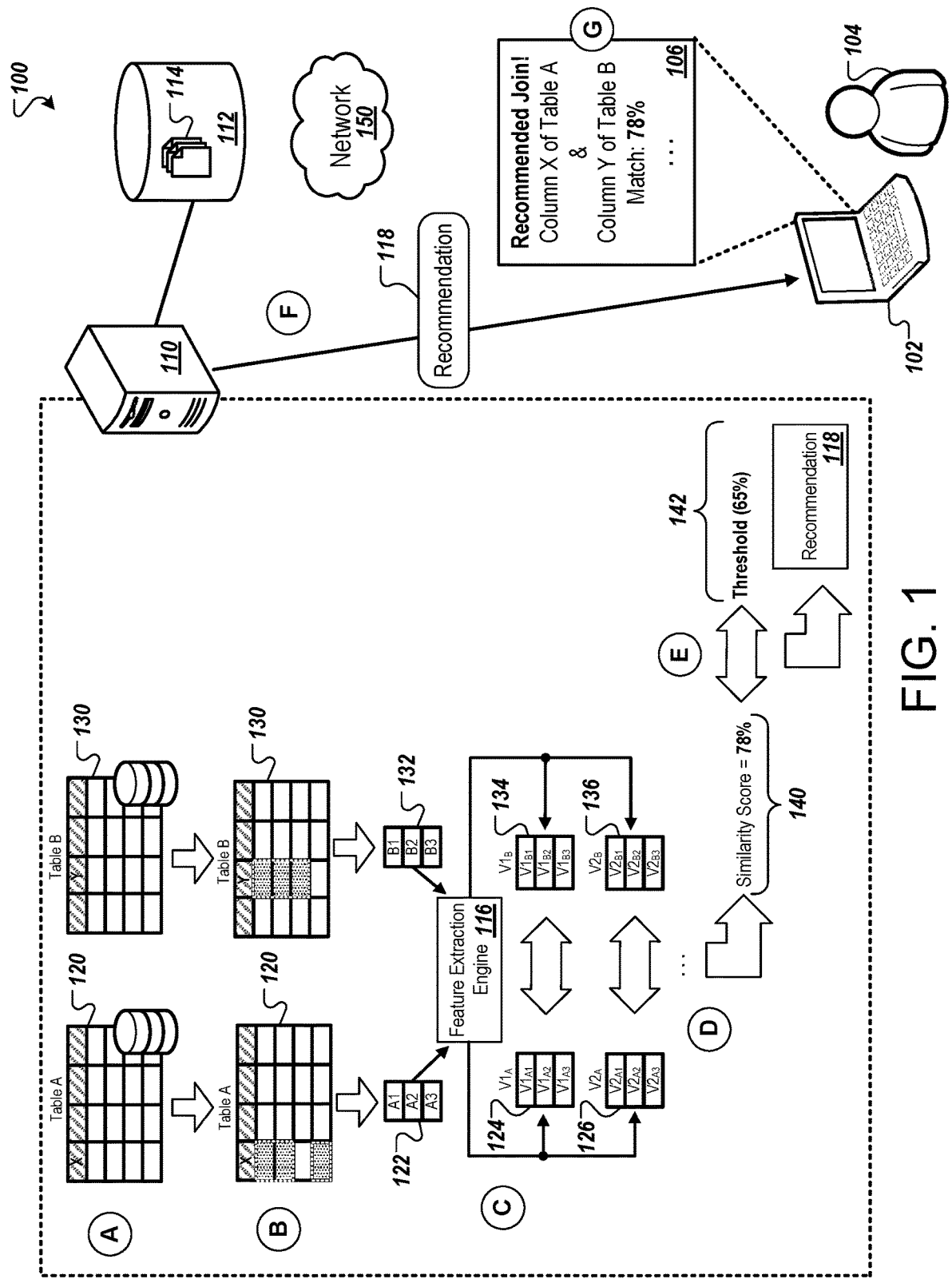
FIG. 1 is a diagram showing an example of a system for inferring joins for data tables.

FIG. 1 is a diagram showing an example of a system 100 for inferring joins for data sets. The system 100 includes a computer system 110 having data storage 112, and a client device 102.

The computer system 110 can provide a user 104 a recommendation 118 to join data of table columns from two different tables. The recommendation 118 may be sent to a client device 102 employed by the user 104.

The computer system 110 may include one or more computing devices. The computer system 110 may communicate with the client device 102 over a network 150. The management system 100 may be able to access data tables from the data storage 112. The management system 100 may be able to access data tables from third-party systems, such as third-party computer systems, server systems, or server environments over the network 150.

The client device 102 may be a computing device, such as a laptop computer, a desktop computer, a mobile phone, a smart phone, or a tablet.

The disclosed techniques provide for efficiently and accurately joining all or parts of data tables. A client may have numerous data tables having substantial dimensions. Analyzing these data tables and the data within to determine if a table join should occur requires significant operations and resources. In addition, comparing every value of one table (or every value from one column of one table) to every value of another table (or every value from one column of another table) may be a poor indicator of whether the tables (or columns of those tables) should be joined in addition to requiring significant operations and resources. The disclosed techniques improve the efficiency by sampling data from a first column of a first table, sampling data from a second column of a second table, and comparing the sampled data. Accordingly, the number of operations and resources required to perform these operations are greatly reduced. In addition, the disclosed techniques provide for, during the comparison process, extracting the features from the sampled data of the first table and the sampled data from the second table, and comparing the extracted features. The results of the comparison between features more accurately reflect whether all or parts of two table should be joined when compared with matching values.

FIG. 1 also illustrates a flow of data, shown as stages (A) to (G), with each representing a step in an example process. Stages (A) to (G) may occur in the illustrated sequence, or in a sequence that is different from the illustrated sequence. For example, some of the stages may occur concurrently.

In FIG. 1, at stage (A), the computer system 110 identifies two tables 120 ("Table A") and 130 ("Table B") to analyze in order to make a determination as to whether all or part of the tables 120 and 130 should be joined. In identifying the two tables 120 and 130, the management system 100 may access the data storage 112 and retrieve two tables from a listing of tables 114. The process of identifying the two tables 120 and 130 may be automated.

In some implementations, table 120 and/or table 130 are retrieved from third-party systems.

In some implementations, table 120 and table 130 are selected for analysis based off of an indication that these tables are similar. This indications may include metadata associated with each of the tables 120 and 130. For example, the computer system 110 may select table 120 and table 130 due to both having been tagged as containing customer information. This indication may be a location of the tables 120 and 130. For example, the computer system 110 may select table 120 and table 130 due to both tables being located in the same folder within the data storage 112 or due to both tables being added to the listing of tables 114.

In some implementations, table 120 and table 130 are selected for analysis based off the computer system 110 receiving input from the user 104 through the client device 102 indicating that all or part of table 120 should be compared with all or part of the table 130. For example, the management system 100 may receive input from the user 104 through the client device 102 indicating that the first column of the table 120 should be compared with the last column of the table 130.

In stage (B), the computer system 110 selects a column of the table 120 ("column X") to compare with a column of the table 130 ("column Y"). As shown, the column X may be the first column in the table 120 and the column Y may be the second column in the table 130. The computer system 110 may select which columns to compare iteratively such that the first column of the table 120 is first compared with the first column of the table 130 before comparing the first column of the table 120 with the second column of the table 130. Alternatively, the computer system 110 may select which columns to compare at random.

In stage (B), the computer system 110 samples the tables 120 and 130. Alternatively, the computer system 110 may sample the selected columns of the tables 120 and 130. The number of samples that the computer system 110 takes from each of the columns may depend on the size of the respective column and/or table. For example, the computer system 110 may obtain a number of samples that represent 5% of the size of the column and/or table, e.g., if the column or table is 100 rows in size, then the computer system 110 would select five values from the column or from each of the columns during sampling. The number of samples that the computer system 110 takes from each of the columns and/or table may be a fixed number. For example, the computer system 110 may obtain 20 values from each of the columns. In this example, if 20 values do not exist (e.g., the table has only 15 rows), then the computer system 110 may obtain all of the values.

As shown, in sampling the tables 120 and 130, the computer system 110 obtains a first set of values 122 for the table 120 and a second set of values 132 for the table 130. With reference to FIG. 3, the values in the set of values 122 and the set of values 132 may include, for example, one or more of the values in the values 304. Accordingly, the set of values 122 and/or the set of values 132 may contain a phone number, an address, etc.

In some implementations, the process of analyzing the tables 120 and 130 is an exhaustive process such that the computer system 110 compares all columns of the table 120 with all columns of the table 130. For example, the computer system 110 may sample every column of table 120, sample every column of table 130, and compare each of the samples of the table 120 with each of the samples of the table 130.

In stage (C), the computer system 110 provides the set of values 122 and the set of values 132 to a feature extraction engine 116. This feature extraction engine 116 may perform operations on the set of values 122 and 132 in order to extract features from each of the values within the set of values 122 and 132, and in order to generate feature vectors. With reference to FIG. 3, the features 302 extracted from the values 304 may include a length of the value, a numeric probability of the value, an alphabetic probability of the value, and a symbol probability of the value. The length is the number of characters that make up the value. In determining the length, the feature extraction engine 116 of the computer system 110 may ignore spaces. In determining the numeric probability, the feature extraction engine 116 of the computer system 110 may divide the count of numbers within the value by the length of the value. In determining the alphabetic probability, the feature extraction engine 116 of the computer system 110 may divide the number of letters in the value by the length of the value. In determining the symbol probability, the feature extraction engine 116 of the computer system 110 may subtract the numeric probability and the alphabetic probability from one. Alternatively, in determining the symbol probability, the feature extraction engine 116 of the computer system 110 may divide the number of symbols in the value by the length of the value.

In stage (C), the feature extraction engine 116 outputs feature vectors 124, 126, 134, and 136. The feature extraction engine 116 may output a feature vector for each feature extracted for each table. Here, the feature vectors 124 and 126 correspond with the table 120. The feature vectors 134 and 136 correspond with the table 130. The feature vectors 124 and 134 correspond with a first feature (e.g., a length, probability of numeric, probability of alphabetic, probability of symbol, etc.). The feature vectors 126 and 136 correspond with a second feature (e.g., a length, probability of numeric, probability of alphabetic, probability of symbol, etc.). As shown, each of the feature vectors 124 and 126 contain feature values that correspond with values from the set of values 122 from the table 120. As shown, each of the feature vectors 134 and 136 contain feature values that correspond with values from the set of values 132 from the table 130.

In some implementations, the feature extraction engine 116 may generate more feature vectors. For example, the feature extraction engine 116 may generate four vectors for column X of the table 120 and four vectors for column Y of the table 130, where there are two vectors for length, two vectors for probability of numeric, two vectors for probability of alphabetic, and two vectors for probability of symbol.

In stage (D), the computer system 110 compares the feature vector 124 with the feature vector 134, and the feature vector 126 with the feature vector 136. The comparison may involve subtracting a vector value associated with the table 130 from a vector value associated with the table 120, or vice-versa. The computer system 110 may take the absolute value of the result. The computer system 110 may subtract the result from 1 in order to obtain a p-value for the two vectors. This calculation can be represented as: p-value=$1-|v^A_{k,p}-v^B_{k,q}|$. Here, k represents a feature or feature vector type (e.g., length feature, numeric probability feature, alphabetic probability feature, or symbol or character probability feature), p represents the first column of the table 120 that was selected as part of the column pair, q represents the second column of the table 130 that was selected as part of the column pair, $v^A_{k,p}$ represents a vector of the feature k for the selected first column of the table 120, and $v^B_{k,q}$ represents a vector of the feature k for the selected second column of the table 130. This calculation can also be represented as:

$$p\text{-value} = 1 - \sqrt{\begin{array}{c}(v^A_{k,p}(1) - v^B_{k,q}(1))^2 + \\ (v^A_{k,p}(2) - v^B_{k,q}(2))^2 + \ldots + (v^A_{k,p}(n) - v^B_{k,q}(n))^2\end{array}}$$

when each of the feature vectors $v^A_{k,p}$ and $v^B_{k,p}$ for the feature k for the given column pair p and q contain at least three values. Here, n represents the last position in each of the feature vectors $v^A_{k,p}$ and $v^B_{k,q}$ for the feature k for the given column pair p and q.

In some implementations, the comparison may also include an averaging step and a division step. The averaging step and division step may be only for particular vectors, e.g., for vectors that do not contain probability values such as feature vectors corresponding to length. The averaging step may involve averaging the two values being compared from the vectors. The division step may divide the obtained absolute value by the average value. The computer system 110 may then subtract the result from 1 in order to obtain a p-value for the two vectors. This calculation can be represented as:

$$p\text{-value} = 1 - \frac{|v^A_1 - v^B_1|}{|(v^A_{k,p} + v^B_{k,q})/2|}.$$

Similarly, this calculation can be represented by:

$$p\text{-value} = 1 - \frac{\sqrt{(v^A_{k,p}(1) - v^B_{k,q}(1))^2 + (v^A_{k,p}(2) - v^B_{k,q}(2))^2 + \ldots + (v^A_{k,p}(n) - v^B_{k,q}(n))^2}}{\sqrt{((v^A_{k,p}(1) + v^B_{k,q}(1))/2)^2 + ((v^A_{k,p}(2) + v^B_{k,q}(2))/2)^2 + \ldots + ((v^A_{k,p}(n) + v^B_{k,q}(n))/2)^2}}$$

when each of the feature vectors $v^A_{k,p}$ and $v^B_{k,p}$ for the feature k for the given column pair p and q contain at least three values.

For example, with reference to FIG. 3, the computer system 110 may subtract the length of 13 for the second value 308 in the list of values 304 from the length of 12 for the first value 306 in the list of values 306 to obtain a result of −1. In this example, the computer system 110 may take the absolute value of −1 to obtain an absolute value of 1. The computer system 110 may take the average of 12 and 13 to obtain an average value of 12.5. The management system may divide the absolute value of 1 by the average value of 12.5 to obtain a value of 0.08. The management system may subtract 0.08 from 1 to obtain a p-value of 0.92, indicating that the two vector values are very similar.

The computer system 110 may average all the values in the respective vectors 124, 126, 134, and 136 prior to the comparison. For example, with reference FIG. 3, the numeric probability vector values for the values 306 and 308 of 10/12 (~0.8333) and 10/13 (~0.7692), respectively, may represent vector values for a first vector. In this example, the numeric probability vector value for the value 310 of 3/10 (0.3) may represent a vector value for a second vector that is to be compared with the first vector. In this example, the computer system 110 may average the vector values in the first vector to obtain an average vector value of 0.8013 (=(0.8333+0.7692)/2). Because there is only one vector value in the second vector, the average vector value is equivalent to the only vector value of 0.3. In this example, a comparison of the first vector with the second vector by the computer system 110 produces a p-value of 0.4987 (=1−|0.8013−0.3|), indicating that the vectors values in these two vectors are not very similar.

In stage (D), the computer system 110 generates a similarity score 140 based off of the comparison of the vectors from the table 120, e.g. the vectors 124 and 126, with the vectors from the table 130, e.g. the vectors 134 and 136. In generating this similarity score 140, the computer system 110 may average the p-values determined in stage (C). For example, here, the computer system 110 may have calculated a p-value of 0.84 between the vector 124 and the vector 134, and a p-value of 0.72 between the vector 126 and the vector 136. In this example, the computer system 110 may average the p-value of 0.84 with the p-value of 0.72 to obtain a similarity score of 0.78 or 78% between column X of the table 120 and column Y of the table 130.

In some implementations, the computer system 110 implements inferential statistics, such as a t-test, to determine whether column X of the table 120 should be joined with column Y of the table 130. Specifically, the computer system 110 may use inferential statistics, such as a t-test, to determine if column X of the table 120 and the column Y of the table 130 are significantly different from each other based on the vectors 124, 126, 134, and 136.

In some implementations, the management's system 110 leverages a machine learning model such as a classifier or a clustering algorithm to determine the similarity score 140. In these implementations, the machine learning model may be trained beforehand with sample data tables. In these implementations, the similarity score may be a binary indicator as to whether the join should occur or not.

With reference to FIG. 4, table 404 shows various similarity scores between various columns of the table 120 and various columns of the table 130. These similarity scores may represent an average of p-values for each of the feature vectors between the columns.

In stage (E), the computer system 110 compares the generated similarity score 140 of 78% with a threshold score 142 of 65%. Here, because the similarity score 140 is greater than or equal to the threshold score 142, the computer system 110 generates a recommendation 118. The recommendation may contain the similarity score 140, an indication of the table 120 (e.g., a table name, a table location, a table size, etc.), an indication of the table 130, an indication of column X of the table 120 to be joined (e.g., a name of the column, a number of rows in the column, etc.), and an indication of the column Y of the table 120 to be joined.

The recommendation 118 may also contain an indication of which table of the tables 120 and 130 the operation is to be performed on, or if it recommends to generate a new table instead. Alternatively, the computer system 110 may leave it up to the user 104 to select which table the join operation should be performed on, or if the join operation should result in the generation of a new table.

The recommendation 118 may also contain an indication of the type of join operation that the computer system 110 recommends. For example, with reference to FIG. 5, an interface 500 is provided which displays a recommendation to join various columns of a first table 502 with various columns of a second table 506. In this example, the computer system 110 has recommended an inner join 512 from a list of join operations 510. Alternatively, the computer system 110 may leave it up to the user 104 to select the type of join, e.g., inner join, left join, right join, full outer join, etc.

In some implementations, instead of generating the recommendation 118, the computer system 110 automatically joins column X of the table 120 with column Y of the table 130. In these implementations, the computer system 110 may automatically select the table that the join is to be performed on, e.g., either on the table 120, the table 130, or a new table generated by the computer system 110. The computer system 110 may also automatically select the type of join, e.g., inner join, left join, right join, full outer join, etc. Certain joins may only be practical if the computer system 110 is generating a new table out of the returned values as would be the case, for example, with a full outer join.

In stage (F), the computer system 110 sends the recommendation 118 to the client device 102 over the network 150.

In stage (G), the client device 102 displays the recommendation 118 on an interface 106. The client device 102 may display the recommendation 118 as a notification to the user 104. As shown, the interface 106 shows the name of the first column to be joined and the name of the associated first table 120, the name of the second column to be joined and the name of the associated second table 130, and the similarity score 140. A more detailed example of displaying a recommendation on an interface is provided in FIG. 5 and described in more detail below.

In stage (G), the user 104 may be able to accept, reject, or modify the recommendation 118. The user 104 may be able to override or modify all or part of the recommendation 118. For example, the user 104 may choose confirm that the join should occur but may override part of the recommendation 118 be selecting the table 130 as the table that the operation should be performed on.

Figure 2:
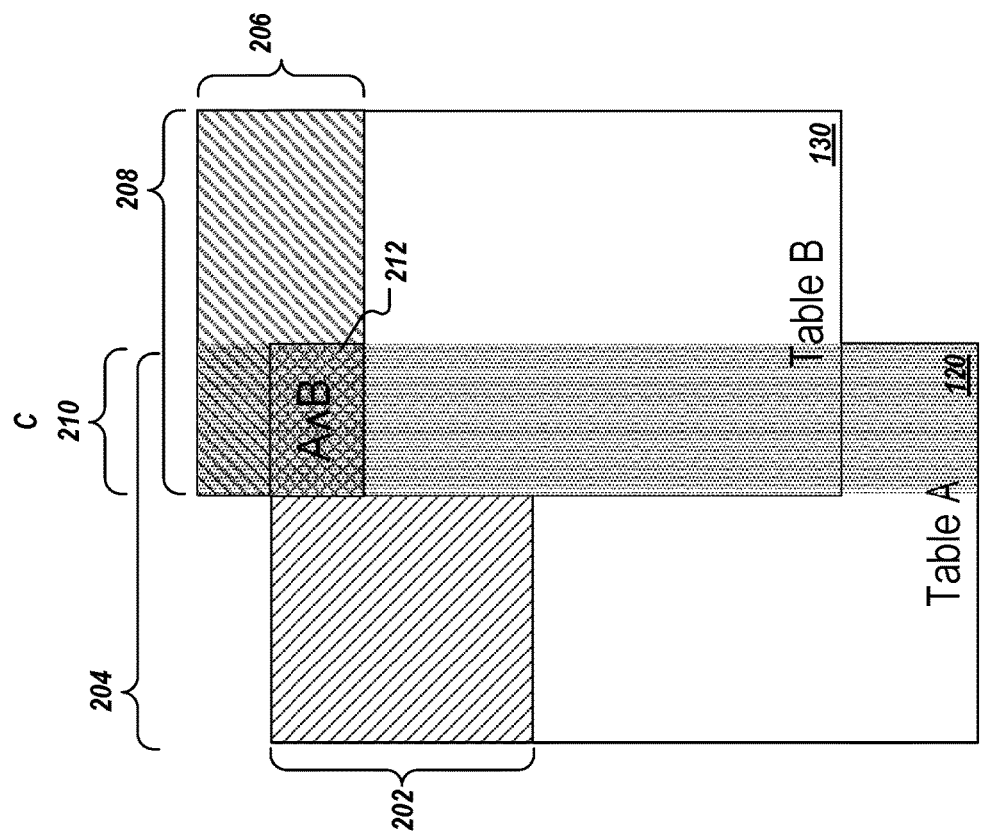
FIG. 2 is a diagram of joining data table columns of two tables.

FIG. 2 is a diagram 200 of joining data table columns of two tables 120 and 130. The table 120 has columns 204 and the table 130 has columns 208. A first set of rows 202 has been sampled from the table 120. A second set of rows 206 has been sampled from the table 130. An area 212 represents the values from the set of rows 202 and the set of row 206 that are the same. As indicated by the size of the area 212, there is a relatively small number of sample values shared between the table 120 and the table 130. Due to the propensity for there to be only a few matching sampled values between tables (or particular columns of tables), matching sampled values is typically going to be a poor indicator as to whether a join operation should occur. This will be discussed in more detail with respect to FIG. 4. A shaded area 210 represents the columns of the tables 120 and 130 that are joinable.

FIG. 3 is a table showing examples of features. The table contains features 302 extracted from values 304. The features 302 include a length of the value, a numeric probability of the value, an alphabetic probability of the value, and a symbol probability of the value. The length is the number of characters that make up the value. In determining the length, the feature extraction engine 116 of the computer system 110 shown in FIG. 1 may ignore spaces. In determining the numeric probability, the feature extraction engine 116 of the computer system 110 shown in FIG. 1 may divide the count of numbers within the value by the length of the value. In determining the alphabetic probability, the feature extraction engine 116 of the computer system 110 shown in FIG. 1 may divide the number of letters in the value by the length of the value. In determining the symbol probability, the feature extraction engine 116 of the computer system 110 shown in FIG. 1 may subtract the numeric probability and the alphabetic probability from one. Alternatively, in determining the symbol probability, the feature extraction engine 116 of the computer system 110 shown in FIG. 1 may divide the number of symbols in the value by the length of the value.

As shown, a first value 306 is a phone number. The feature extraction engine 116 of the computer system 110 shown in FIG. 1 may have extracted a length feature of 12 from the value 306 due to their being 12 characters in the phone number. The feature extraction engine 116 of the computer system 110 shown in FIG. 1 may have extracted a numeric probability feature of 10/12 from the value 306 due to their being 10 numbers in the phone number and the phone number having a length of 12 characters. The feature extraction engine 116 of the computer system 110 shown in FIG. 1 may have extracted an alphabetic probability feature of 0 from the value 306 due to their being no letters in the phone number. The feature extraction engine 116 of the computer system 110 shown in FIG. 1 may have extracted a symbol probability feature of 2/12 from the value 306 due to the numeric probability being 10/12 and the alphabetic probability being 0, or due to their being two symbols in the phone number and the phone number having a length of 12 characters.

As shown, a second value 308 is another phone number in a different format than the first value 306. The feature extraction engine 116 of the computer system 110 shown in FIG. 1 may have extracted a length feature of 13 from the value 308 due to their being 13 characters in the phone number. The feature extraction engine 116 of the computer system 110 shown in FIG. 1 may have extracted a numeric probability feature of 10/13 from the value 308 due to their being 10 numbers in the phone number and the phone number having a length of 13 characters. The feature extraction engine 116 of the computer system 110 shown in FIG. 1 may have extracted an alphabetic probability feature of 0 from the value 308 due to their being no letters in the phone number. The feature extraction engine 116 of the computer system 110 shown in FIG. 1 may have extracted a symbol probability feature of 3/12 from the value 308 due to the numeric probability being 10/13 and the alphabetic probability being 0, or due to their being three symbols in the phone number and the phone number having a length of 13 characters.

As shown, a third value 310 is an address. The feature extraction engine 116 of the computer system 110 shown in FIG. 1 may have extracted a length feature of 10 from the value 310 due to their being 10 characters in the phone number. The feature extraction engine 116 of the computer system 110 shown in FIG. 1 may have extracted a numeric probability feature of 3/10 from the value 310 due to their being three numbers in the address and the address having a length of 10 characters. The feature extraction engine 116 of the computer system 110 shown in FIG. 1 may have extracted an alphabetic probability feature of 6/10 from the value 310 due to their being six letters in the address. The feature extraction engine 116 of the computer system 110 shown in FIG. 1 may have extracted a symbol probability feature of 1/10 from the value 310 due to the numeric probability being 3/10 and the alphabetic probability being 6/10, or due to their being one symbol in the address and the address having a length of 10 characters.

FIG. 4 is a diagram depicting two similarity score matrices 402 and 404. The first similarity score matrix 402 is generated by matching the sampled values between the columns 406 of the table 120 and the columns 408 of the table 130. The second similarity score matrix 404 is generated using the techniques described above with respect to FIG. 1. These techniques include generating feature vectors, obtaining p-value, and, in some implementations, using statistical inferences and/or machine learning models.

As shown, the similarity score matrix 402 does not provide a good indication that any of the columns of the table 120 should be joined with any of the columns of the table 130. Although there are some values between various columns of the tables 120 and 130, indicating that there has been a match of one or more sampled values, the similarity score indicates that there are relatively few matches (between 7.69% match and 16.667% match) and provides little to no assurance that these columns should be joined.

The similarity score matrix 404 provides a much better indication as to which columns should be joined when compared with the similarity score matrix 402 because similarity score matrix 404 is produced using the features of the sampled values, not the values themselves. For example, in the similarity score matrix 404, the similarity scores shown may have been calculated by the computer system 110 using the feature vectors discussed above with respect to FIG. 1.

As shown, there is a similarity score of 77.165% between the ID column of the table 120 and the Badge_ID column of the table 130, a similarity score of 94.984% between the NAME column of the table 120 and the Badge_Name column of the table 130, a similarity score of 98.284% between the EMAIL column of the table 120 and the Badge_Email column of the table 130, a similarity score of 75.694% between the PHONE column of the table 120 and the Badge_Phone column of the table 130, and a similarity score of 98.98% between the TITLE column of the table 120 and the Badge_Title column of the table 130. If the computer system 110 were to use a similarity score threshold of 75% or below, each of the similarity scores between the stated columns would be sufficient for the computer system 110 to recommend for those respective columns to be joined.

Figure 5:
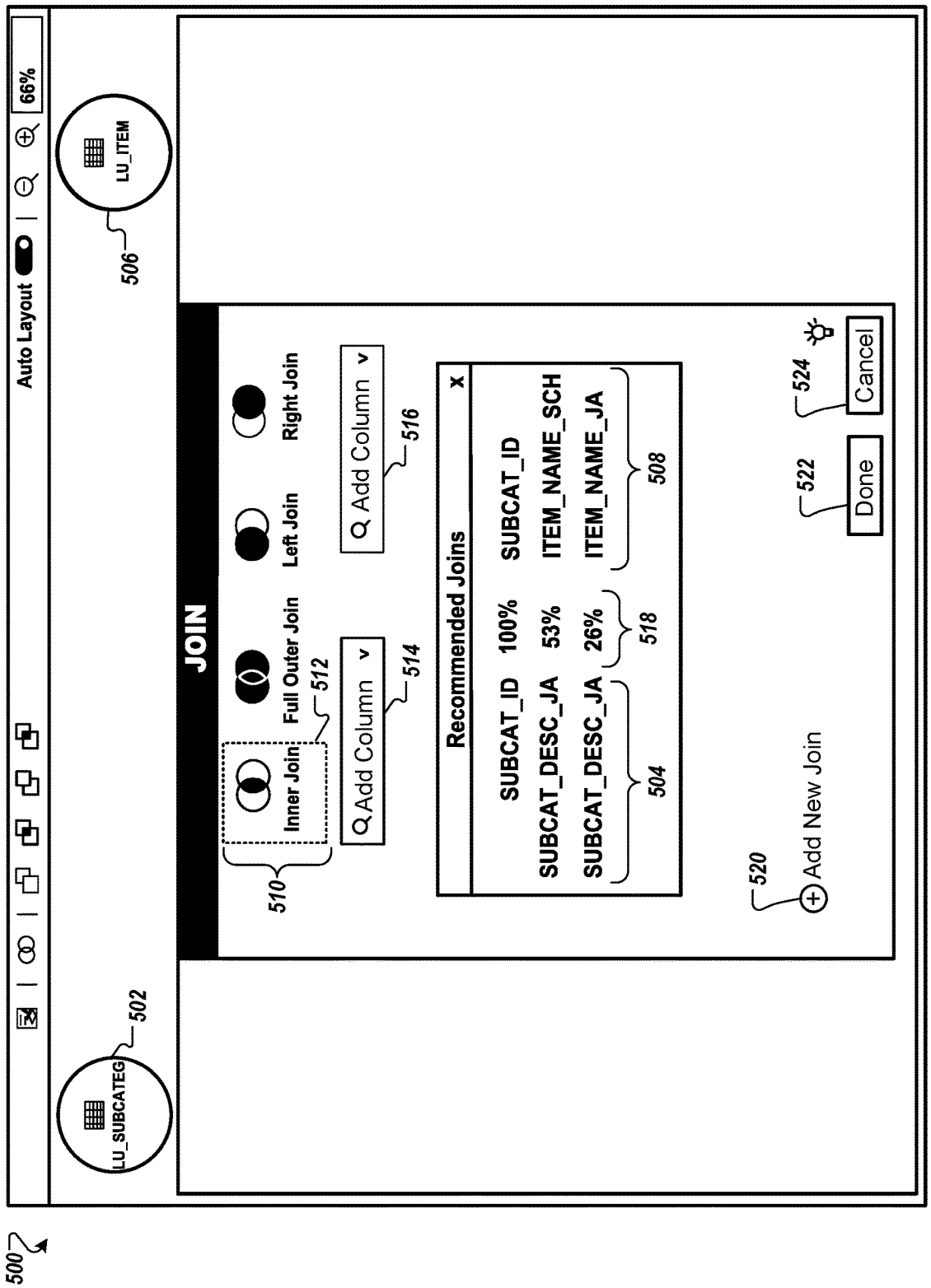
FIG. 5 is an example interface for inferring joins for data sets.

FIG. 5 is an example interface 500 for inferring joins for data sets. The interface 500 displays an example recommendation provided by, for example, the computer system 110 shown in FIG. 1. The interface 500 includes an indication of a first table 502 and an indication of a second table 506. The interface 500 shows a series of a join operations 510. The join operations 510 include an inner join 512, a full outer join, a left join, and a right join. Here, the inner join 512 has been selected. This selection may have been made by the user 104 through the client device 102 shown in FIG. 1. This selection may have been made by computer system 110 shown in FIG. 1.

The interface 500 shows the recommended joins of a first set of columns 504 of the table 502 with a second set of columns 508 of the table 506. The interface 500 also displays a list of similarity scores 518 for each of the recommended joins. As shown, there is a similarity score of 100% between the SUBCAT_ID column of the table 502 and the SUBCAT_ID column of the table 506, a similarity score of 53% between the SUBCAT_DESC_JA column of the table 502 and the ITEM_NAME_SCH column of the table 506, and a similarity score of 26% between the SUBCAT_DESC_JA column of the table 502 and the ITEM_NAME_JA column of the table 506. The column combinations are displayed in the interface 500 in descending order of similarity score.

A user may select to add a column from the table 502 to a join through the drop-down menu 514. The user may select to add a column from the table 506 to a join through the drop-down menu 516. The user may select the button 520 to create a new join. If the user selects the button 522, the joins displayed (e.g., the recommended joins) will be performed and a notification may be sent, for example, to the computer system 110 shown in FIG. 1. If the user selects the button 524, no join operations will be performed.

Figure 6:
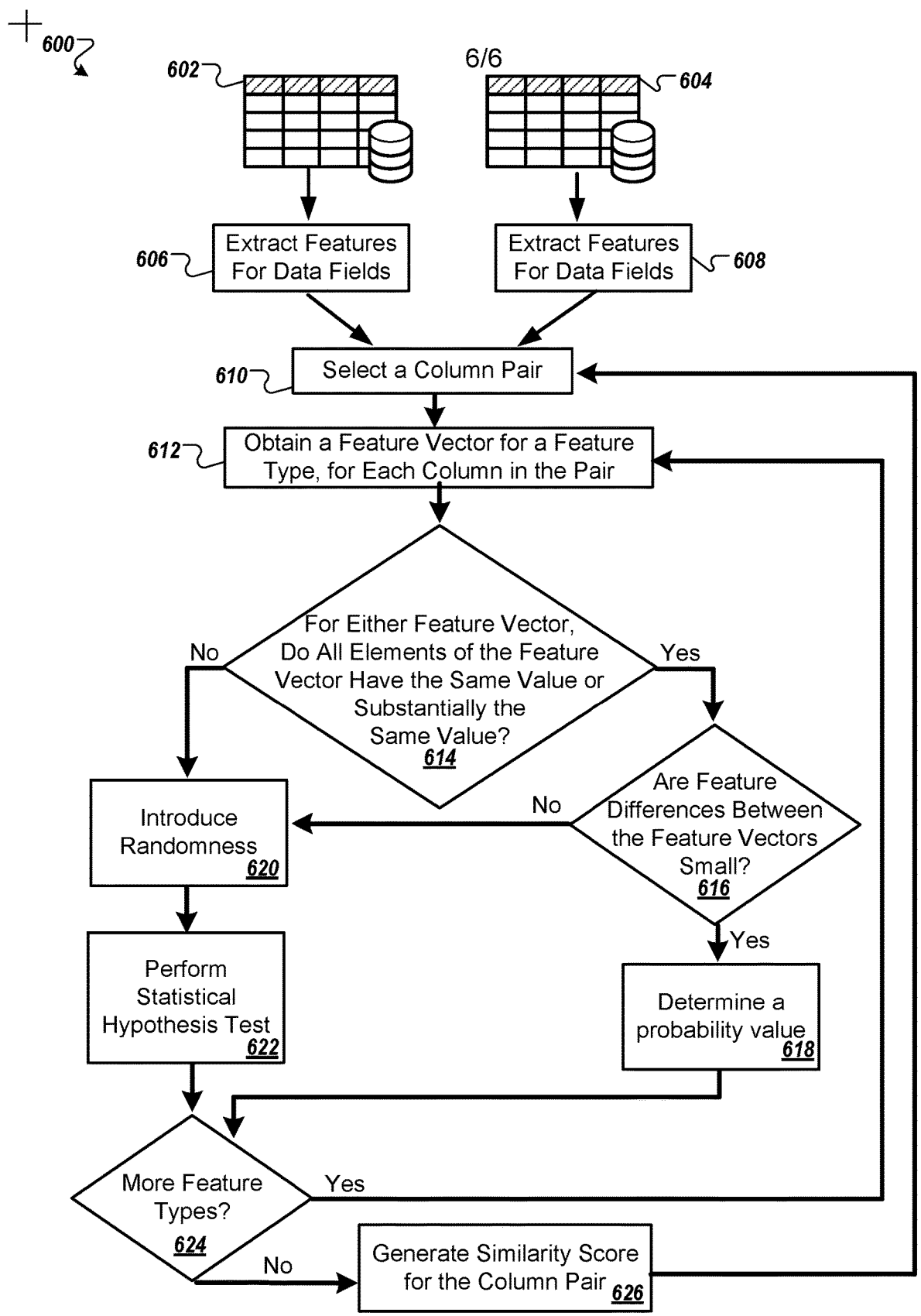
FIG. 6 is a flow diagram illustrating an example of a process for inferring joins for data sets.

FIG. 6 is a flow diagram illustrating an example of a process 600 for inferring joins for data sets. The process 600 can be performed, at least in part, by one or more computers, such as by the computing system 110 described above.

The process 600 can be used to evaluate the similarities between data sets 602, 604 and determine which portions of the data sets 602, 604 should be joined. In the example discussed in FIG. 6, the data sets 602, 604 are database tables with data organized in columns and rows, but other types of data sets may also be used. For example, instead of identifying columns to join, the process may evaluate other segments or portions of data sets to potentially join.

In the example, the first data set 602 has $m_1$ columns and $n_1$ rows. The second data set 604 has $m_2$ columns and $n_2$ rows. The number of rows and columns need not be the same for the two data sets 602, 604. In addition, as discussed above, only a subset (e.g., a down-sampled or randomly sampled portion) of each data set 602, 604 may be used for the analysis. For example, if the number of rows $n_1$ of the first data set 602 is one million, the process may use only a subset of those rows (e.g., one hundred thousand rows, fifty thousand rows, ten thousand rows, etc.) to evaluate column joins. Similarly, only a subset of the rows of the data set 604 may be used for analysis.

In some cases, the first data set 602 is a data table. For example, the first data set 602 can be the table 120 shown in FIG. 1. In other cases, the first data set 602 is a subset of data fields from a data table. For example, the first data set 602 can include the first set of values 122 obtained from the first column of the table 120 shown in FIG. 1. The first data set 602 may include additional sets of data for each of the other columns within the table 120. Where the first data set 602 is a subset of data fields from a data table, the first data set 602 may be generated by sampling the data table (e.g., sampling each of the columns of the data table). For example, the first data set 602 may be generated by the system 100 sampling the table 120 shown in FIG. 1.

In some cases, the second data set 604 is a data table. For example, the second data set 604 can be the table 130 shown in FIG. 1. In other cases, the second data set 604 is a subset of data fields from a data table. For example, the second data set 604 can include the second set of values 132 obtained from the second column of the table 130 shown in FIG. 1. The second data set 604 may include additional sets of data for each of the other columns within the table 130. Where the second data set 604 is a subset of data fields from a data table, the second data set 604 may be generated by sampling the data table (e.g., sampling each of the columns of the data table). For example, the second data set 604 may be generated by the system 100 sampling the table 130 shown in FIG. 1.

In steps 606 and 608, one or more computers extract features for (e.g., generate feature values derived from) data fields from a first data set 602 (step 606) and data fields of the second data set (step 608). For each data field, multiple types of feature values can be determined. Examples include values for a length feature, a numeric probability feature, an alphabetic probability feature, and a symbol probability feature. As discussed above, the length feature value can be a total number of characters in the data field. The numeric probability feature can be a number of numeric characters divided by the total number of characters in the data field. The alphabetic probability feature can be a number of alphabetic characters divided by the total number of characters in the data field. The symbol probability feature can be a number of symbol characters (e.g., punctuation and/or other non-numeric and non-alphabetic characters) divided by the total number of characters in the data field. Other types of features may be used, in addition or as an alternative. Examples of these feature types include counts of different character types (e.g., numbers, alphabetic characters, symbols, whitespace, etc.), features indicating whether specific characters are present, features indicating whether a particular pattern or sequence is present, and so on.

These feature types can provide indications of the content of the data field at a general level, without requiring exact matches or specific formatting of the data. With these features, similar types of values will have similar feature scores. For example, the features will show that street address values will have similar types and proportions of character content (e.g., high likelihood of alphabetic characters, consistently including at least some digits, and moderate to long length), even though none of the addresses from different data sets may actually match. Similarly, telephone numbers will have very similar types and proportions of character content (e.g., majority of characters are digits, typically 7 or 10 digits total, typically a few symbol characters, and typically no alphabetic characters), even though none of the phone numbers from different data sets may actually match. Thus, using the feature values for multiple feature types can characterize the general content and/or structural attributes of data elements, allowing data of the same type and content to be recognized even when there are variations and differences between the data sets (e.g., differences in formatting choices, order of content, no actual matches between two columns, etc.).

The use of a set of extracted features, as discussed herein, can increase the robustness and predictive ability of the join analysis system. By assessing sets of features generalized from data values, rather than comparing the actual values, the system has an improved ability to find join potential with relatively small sample sizes. Consequently, this allows the system to accurately identify helpful joins even when analyzing small data sets or small subsets of data sets.

Another advantage of this approach is that the system does not require any advance knowledge of the types of data in the data sets being assessed or the formatting of that data. As an example, without any indication that columns include addresses, and without any predetermined format for addresses being defined, the process 600 can determine that two columns of addresses should be joined simply based on the similarity of the feature scores for their data elements. The system does not require any comparison to any pre-defined specification for data and does not require any semantic interpretation or labelling of data types. Rather, the characteristics of the content of the data elements, as shown by a set of feature scores for each data element, provide the basis for assessing similarity and joint potential. The process 600 can be used to accurately identify potential for joins even for columns of new types of data or formats of data that were not previously used or not ever defined. By assessing the features representing characteristics of the content of data elements themselves, the techniques herein can be applied to identify similarity and join potential for any type of data.

Each of a predetermined set of multiple features can be determined for each data field to be used in the join analysis. For example, consider a first table that has ten columns and a sampled set of ten thousand rows is used for join analysis. If four feature types are used for analysis, there would be four feature values determined for each value in the sampled set. For each of the ten columns, there would be four feature vectors of ten thousand elements. For example, for the first column, there could be (1) a first feature vector of 10,000 feature values for a length feature, (2) a second feature vector of 10,000 feature values for a numeric feature, (3) a third feature vector of 10,000 feature values for an alphabetic feature, and (4) a fourth feature vector of 10,000 feature values for a symbol feature. This way, every data element in the 10,000 rows that were sampled would have a feature value for each of the different feature types used. Each column of both data sets 602, 604 would have feature values determined in this manner.

Referring to step 606, the features may be extracted by the computer system 110 shown in FIG. 1, for example, by the feature extraction engine 116. The feature extraction engine 116 may generate a vector for each of the multiple feature types extracted from one or more of the fields of the first data set 602. For example, the feature extraction engine 116 may generate a length feature vector containing a length value for each of the data fields in a subset of data fields of the first data set 602. The feature extraction engine 116 can generate a numeric feature vector containing a numeric probability value for each of the data fields in the subset of data fields of the first data set 602. The feature extraction engine 116 can generate an alphabetic feature vector containing an alphabetic probability value for each of the data fields in the subset of data fields of the first data set 602. The feature extraction engine 116 can generate a symbol feature vector containing a symbol probability value for each of the data fields in the subset of data fields of the first data set 602.

In some cases, where the first data set 602 is a data table (such as the data table 120 shown in FIG. 1), extracting the features from the first data set 602 may include the system 100 (e.g., by the computer system 110) selecting a subset of data fields from the first data set 602 and providing the subset of data fields from the first data set 602 to the feature extraction engine 116.

Referring to step 608, the features may be extracted by the computer system 110 shown in FIG. 1, for example, by the feature extraction engine 116. The feature extraction engine 116 may generate a vector for each of the multiple feature types extracted from one or more of the fields of the second data set 604. For example, the feature extraction engine 116 may generate a length feature vector containing a length value for each of the data fields in a subset of data fields of the second data set 604. The feature extraction engine 116 can generate a numeric feature vector containing a numeric probability value for each of the data fields in the subset of data fields of the second data set 604. The feature extraction engine 116 can generate an alphabetic feature vector containing an alphabetic probability value for each of the data fields in the subset of data fields of the second data set 604. The feature extraction engine 116 can generate a symbol feature vector containing a symbol probability value for each of the data fields in the subset of data fields of the second data set 604.

In some cases, where the second data set 604 is a data table (such as the data table 130 shown in FIG. 1), extracting the features from the second data set 604 may include the system 100 (e.g., by the computer system 110) selecting a subset of data fields from the second data set 604 and providing the subset of data fields from the second data set 604 to the feature extraction engine 116.

In step 610, one or more computers select a pair of columns, one from each of the data sets 602, 604. For example, the computer system 110 may select a column of the first data set 602 and a column of the second data set 604 to obtain the column pair. The columns in the column pair will be assessed to determine if they should be joined or recommended to a user to be joined.

The selection of column pairs in step 610 can be done so that, in different iterations of steps 610 to 626, each of the columns of the data set 602 is compared with each of the columns of the data set 604. The process 600 shows a loop in which, after the similarity score for one column pair is determined in step 626, the process 600 returns to step 610 to select another column pair. The process 600 can be performed so that each of the columns of data set 602 are compared to each of the columns of data set 604 in respective iterations of the steps 610 to 626. For example, one iteration of the process can select column 1 of data set 602 and column 1 of data set 604 to be compared, another iteration can select column 1 of data set 602 and column 2 of data set 604 to be compared, and so on through the remaining columns of data set 604. Then additional iterations can select column 2 of data set 602 and column 1 of data set 604 to be compared, another iteration can select column 2 of data set 602 and column 2 of data set 604 to be compared, and so on through the remaining columns of data set 604. This can repeat until all columns of data set 602 have been compared with all columns of data set 604.

For example, when the process 600 is performed a first time with the first data set 602 and the second data set 604, the computer system 110 may select the first column of the first data set 602 and the first column of the second data set 604. When step 610 is performed again, the computer system 110 may again select the first column of the first data set 602 and the second column of the second data set 604. In subsequent performances of the portion of the process 600, the computer system 110 may continue to iteratively select new column pairs from the data sets 602, 604. In subsequent performances of the portion of the process 600 with the data sets 602 and 604, the computer system 110 may select only column pairs of the data sets 602, 604 that have not been previously selected. Once all of the different column pairs have been selected and been given a similarity score, the process 600 ends.

In some implementations, extracting features for data fields from the first data set 602 (step 606) and extracting features for data fields from the second data set 604 (step 608) is performed after or in response to selecting a column pair in step 610. In these implementations, features may be extracted on demand from the data fields of the column pair rather than in advance. In step 612, the one or more computers obtain a feature vector for both columns in the column pair. The feature vectors are for a same, particular feature type (e.g., both vectors representing length values, both vectors include numeric probability values, etc.). The process 600 includes a loop to assess the features of each type one by one. Accordingly, the one or more computers can select one of the multiple feature types to assess, and a score for that feature type will be determined for the current column pair during the current iteration of steps 612 to 624. The feature values for the other feature types will be assessed in turn when the process 600 returns to step 612.

As an example, the computer system 110 may select one of the four feature types shown in FIG. 3. The feature types may include length, numeric probability, alphabetic probability, and symbol probability. To select a feature type, the computer system 110 may identify a feature type that has not previously been selected for the column pair currently under evaluation.

The feature type may be represented by a variable. For example, a feature vector $v^A_{k,p}$ may be generated during the feature extraction of data fields from the first data set 602. Here, A represents the first data set 602, k represents a feature or feature vector type (e.g., length feature, numeric probability feature, alphabetic probability feature, or symbol probability feature), p represents the column of the first data set 602 that was selected as part of the column pair. Similarly, a feature vector $v^B_{k,q}$ may be generated during the feature extraction of data fields from the second data set 604. Here, B represents the second data set 604, k again represents the feature or feature vector type (e.g., length feature, numeric probability feature, alphabetic probability feature, or symbol probability feature), and q represents the column of the second data set 604 that was selected as part of the column pair. Each of the feature types may correspond with or be identified by a particular integer. For example, the length feature type can be identified when k=1, the numeric probability feature type can be identified when k=2, the alphabetic probability feature type can be identified when k=3, and the symbol or character probability feature type can be identified when k=4. Accordingly, in selecting a feature type, the computer system 110 shown in FIG. 1 may iteratively select a value fork (e.g., starting with selecting k=1) or may randomly select a value for k (e.g., starting with selecting k=1, k=2, k=3, or k=4). With this notation, the values of p and q are selected in step 610, and the value of k is selected in step 612.

In step 614, the one or more computers determine whether either feature vector obtained in step 612 has all elements of the same or substantially the same value. The computer system 110 shown in FIG. 1 may determine whether all values in the feature vector $v^A_{k,p}$ are the same and/or that all values in the feature vector $v^B_{k,q}$ are the same. As an example, for the current values of feature type k and the column pair p and q, if the feature vector $v^A_{k,p}=\{0.9, 0.9, 0.9, 0.9, 0.9\}$, then the computer system 110 may determine that at least one of the two feature vectors being evaluated at the current iteration has all the same values. Thus, at least one of the feature vectors $v^A_{k,p}$ and $v^B_{k,q}$ includes all the same values.

In some implementations, a determination is made as to whether all values in either of the feature vectors of the feature type and the column pair are substantially the same instead of the same. In some implementations, a threshold amount is defined to determine whether values match. Values may be considered to be the same if the values are within a certain range or do not differ by more than the threshold amount. For example, the computer system 110 shown in FIG. 1 may determine, for either of the feature vectors $v^A_{k,p}$ or $v^B_{k,q}$, whether all the values in the vector in are substantially the same. The computer system 110 may determine that all the values are substantially the same when they are within a threshold percentage of one another, a mean value, a median value, etc. For example, the computer system 110 may determine that all values are substantially the same when they are within 1%, 2%, or 5% of the average of all of the values. The computer system 110 may determine that all values are substantially the same if they have the same approximate value out to a predetermined decimal place (e.g., two decimal places, three decimal places, etc.). For example, if $v^B_{k,q}=\{0.902; 0.904; 0.899; 0.896; 0.903\}$, the computer system 110 may determine that all values within the feature vector $v^B_{k,q}$ are substantially the same since all values have the same approximated value of 0.90 determined by rounding the values to two decimal places.

If the decision at step 614 is that either feature vector contains the same or substantially the same value, the process proceeds to step 616. Step 616 involves determining if the differences between the feature vectors are small (616). For example, the computer system 110 may determine if the differences between the feature vectors for the selected feature type of the selected column pair are less than a threshold. The computer system 110 may take the absolute value or magnitude of the difference between a first feature vector corresponding to the first data set 602 and a second feature vector corresponding to the second data set 604. This may be represented by: $|v^A_{k,p}-v^B_{k,q}|$. As discussed above, k represents a feature or feature vector type (e.g., length feature, numeric probability feature, alphabetic probability feature, or symbol probability feature), p represents the column of the first data set 602 that was selected as part of the column pair, q represents the column of the second data set 604 that was selected as part of the column pair, $v^A_{k,p}$ represents a vector of the feature k for the selected column of the first data set 602, and $v^B_{k,q}$ represents a vector of the feature k for the selected column of the second data set 604. This calculation can also be represented by:

$$\sqrt{(v^A_{k,p}(1)-v^B_{k,q}(1))^2+(v^A_{k,p}(2)-v^B_{k,q}(2))^2+\ldots+(v^A_{k,p}(n)-v^B_{k,q}(n))^2}$$

when each of the feature vectors $v^A_{k,p}$ and $v^B_{k,q}$ for the feature k for the given column pair p and q contain at least three values. Here, n represents the last position in each of the feature vectors $v^A_{k,p}$ and $v^B_{k,q}$ for the feature k for the given column pair p and q. The computer system 110 may then compare the calculation result with a threshold value. For example, the threshold value may be set to 0.002 or 0.2%. If the calculation result is below the threshold value, the computer system 110 may determine that the difference in feature values for the feature k for the column pair p and q is small, e.g., less than the predetermined threshold value.

In some cases, where the feature vectors include values that are greater than 1.0 (e.g., values that do not represent a probability such as the values within the length feature vector), the computer system 110 performs an averaging and division step with the two feature vectors. For example, in these cases, the computer system 110 may calculate the result using the calculation represented by:

$$\frac{|v^A_{k,p}-v^B_{k,q}|}{|(v^A_{k,p}+v^B_{k,q})/2|}.$$

For example, the computer system 110 may use that calculation in place of the calculation represented by: $|v^A_{k,p}-v^B_{k,q}|$. The computer system 110 may then proceed to compare the calculation result with the threshold value as described above. This calculation may also be represented by:

$$\frac{\sqrt{(v^A_{k,p}(1)-v^B_{k,q}(1))^2+(v^A_{k,p}(2)-v^B_{k,q}(2))^2+\ldots+(v^A_{k,p}(n)-v^B_{k,q}(n))^2}}{\sqrt{((v^A_{k,p}(1)+v^B_{k,q}(1))/2)^2+((v^A_{k,p}(2)+v^B_{k,q}(2))/2)^2+\ldots+((v^A_{k,p}(n)+v^B_{k,q}(n))/2)^2}}$$

when each of the feature vectors $v^A_{k,p}$ and $v^B_{k,q}$ for the feature k for the given column pair p and q contain at least three values. Here, n again represents the last position in each of the feature vectors $v^A_{k,p}$ and $v^B_{k,q}$ for the feature k for the given column pair p and q.

If differences between the feature vectors are determined to be small in step 616, a probability value or score is determined based on the feature vectors in step 618. As an example, the probability value (p-value) may represent the similarity of features values between the feature vectors for the selected feature type k of the selected column pair p and q. Specifically, the p-value may equal one minus the absolute value or magnitude of the difference between the features vectors for the selected feature type k of the selected column pair p and q. This may be represented by:

$$P_{p,q,k}=1-|v^A_{k,p}-v^B_{k,q}| \text{ or } P_{p,q,k}=1-\frac{|v^A_{k,p}-v^B_{k,q}|}{|(v^A_{k,p}+v^B_{k,q})/2|}$$

(e.g., when calculating a p-value for a non-probability feature type such as the length feature type). Here, $P_{p,q,k}$ represents the p-value of the feature type k and the selected column pair p and q. As an example, if the absolute value or magnitude of the difference between the feature vectors for a given feature type in the selected column pair is equal to 0.0015, then the p-value for that feature type for the selected column pair equals one minus 0.0015. Therefore, the p-value would equal 0.9985 or 99.85% for the given feature type of the selected column pair.

If the decision in step 614 or step 616 is negative, the one or more computer can optionally introduce randomness to the values in the feature vectors in step 620. For example, the computer system 110 may introduce randomness or noise to the two feature vectors obtained in step 612. The randomness or noise may be added to the two feature vectors in order to increase variance, e.g., to avoid a very small or zero variance that could result in a singularity error when calculating a p-value in step 622. In introducing randomness or noise to the feature vectors, the computer system 110 may alter some or all feature values in the feature vectors by adding or subtracting relatively small random or pseudorandom values. This can introduce noise or additional random variation among the values within the feature vectors. The values added may be within preset limits, e.g., between 0% and a threshold percentage of the feature value being modified. The value added may be randomly selected from values within the preset limits. For example, the computer system 110 may set a maximum value to 0.1%. The computer system 110 may than randomly select a value between −0.1% and 0.1% for each feature value in the feature vectors and then add the amount corresponding to the selected percentage value to each of the corresponding vector values. This may be represented by $v_{new}(m)^A_{k,p} = v(m)^A_{k,p} + (v(m)^A_{k,p} * r_m)$ and $v_{new}(n)^B_{k,q} = v(n)^B_{k,q} + (v(n)^B_{k,q} * r_n)$, where $0 \le r_m \le 0.1$ and $0 \le r_n \le 0.1$.

In step 622, the one or more computers determine a score or p-value for the feature vectors, for example, by performing a statistical hypothesis test. The statistical hypothesis test may be a t-test. The output of the statistical hypothesis test may be a p-value for the feature vectors for the selected feature type of the selected column pair. For example, the computer system 110 may perform the t-test using $v^A_{k,p}$ and $v^B_{k,q}$ as inputs, and may output a p-value for the selected feature type k and column pair p and q.

In step 624, the one or more computers determine whether there are more feature types (e.g., values of k) that have not been evaluated for the current column pair (e.g., the current values of p and q). Determining whether there are more feature types may include determining how many feature types for the selected column pair have been previously selected. For example, if there are four feature types and the computer system 110 determines that less than four feature types have previously been selected for the selected column pair, then the computer system 110 may determine that there are one or more feature types. Determining whether there are more feature types may include determining which feature types have previously been selected for the selected column pair. For example, if there are four feature types and the computer system 110 determines that a length feature type, a numeric probability feature type, and an alphabetic probability feature type have been previously selected for the selected column pair, the computer system 110 may determine that there is one more feature type (e.g., a character or symbol probability feature type). Determining whether there are more feature types may include comparing the number of p-values generated with the number of feature types. For example, if only three p-values have been calculated and there are four feature types, the computer system 110 may determine that there is another, yet to be selected, feature type.

In step 626, the one or more computers generate a similarity score for the column pair (626). The similarity score may be generated using all of the p-values or scores calculated for the current column pair (e.g., the column pair represented by the current values of p and q). The similarity score may be an average of all the calculated p-values or scores calculated for the current column pair for the different feature types. This may be represented by: $= \Sigma_{k=1}^{k=t} P_{p,q,k}/t$, where t represents the total number of feature types. For example, where the extracted features only include length, numeric probability, alphabetic probability, and symbol probability, then t=4.

As discussed above, the p-values or scores for individual feature types may be determined in different ways, e.g., in steps 622 or 618, depending on the outcomes of the decision blocks 614 and 616. This is optional, however, and in some implementations steps 614, 616, and 618 may be omitted so that all p-values or scores are determined using the same process or technique.

The one or more computers can use the outcome of the overall similarity score for a column pair to assess whether columns should be joined. In some implementations, if the similarity score is equal to or greater than a threshold value, the computer system 110 may automatically join the columns in the column pair or may generate a recommendation (e.g., to provide to a user or system administrator) to join the columns in the column pair. If the similarity score is below a threshold value, the computer system 110 may not join the columns in the column pair, may not generate a recommendation to join the columns, and/or may generate a recommendation (e.g., to provide to a system administrator) to not join the columns in the column pair. Once the similarity score for the selected column pair is generated, a new column pair of the first data set 602 and the second data set 604 may be selected, unless, for example, all column pair combinations have previously been selected.

As explained above, portions of the process 600 may be repeated a number of times for two given data sets. For example, a portion of the process 600 may restart with selecting a new column pair if the computer system 110 determines that there are column pairs that have yet to be analyzed. However, if all column pairs have already been processed (e.g., by the computer system 110), then the process 600 is complete for the given data sets 602 and 604.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims can be performed in a different order and still achieve desirable results.

What is claimed is:

1. A method performed by one or more computers, the method comprising:
    identifying, by the one or more computers, a first data table and a second data table, wherein the first data table comprises first columns, and wherein the second data table comprises second columns;
    selecting, by the one or more computers, a first subset of records from the first data table and a second subset of records from the second data table;
    for each of the first columns, generating, by the one or more computers, a set of first feature vectors comprising a first feature vector for each of multiple feature types, wherein each of the first feature vectors comprises a feature value for each of the records in the first subset of records;

for each of the second columns, generating, by the one or more computers, a set of second feature vectors comprising a second feature vector for each of the multiple feature types, wherein each of the second feature vectors comprises a feature value for each of the records in the second subset of records;

based on the sets of first feature vectors and the sets of second feature vectors, determining, by the one or more computers, a set of similarity scores for each of multiple pairs of columns, the set of similarity scores for each pair of columns comprising a similarity score for each of the multiple feature types, wherein each of the multiple pairs of columns comprises one of the first columns and one of the second columns;

for each of the multiple pairs of columns, evaluating, by the one or more computers, whether one or more of the similarity scores for the pair of columns indicate at least a minimum threshold level of similarity between first column in the pair and the second column in the pair of columns; and selectively joining, by the one or more computers, the pairs of columns based on whether the similarity scores for the pairs of columns are determined to indicate at least the minimum threshold level of similarity.

2. The method of claim 1, wherein, in at least one of the first feature vectors and in at least one of the second feature vectors, the feature values are each determined for a different field and the feature value for each field is based on at least one of:
a length of data in the field;
a number of numeric digits in the field;
of alphabetic characters in the field; or
a number of characters in the field that are non-numeric and non-alphabetic.

3. The method of claim 1, wherein determining the set of similarity scores comprises:
for one of the pairs of columns comprising a particular first column of the first data table and a particular second column of the second data table, performing a statistical hypothesis test using a first feature vector representing feature values for the first column and a second feature vector representing feature values for the second column; and
generating a similarity score for the particular first column and the particular second column based on the results of the statistical hypothesis test.

4. The method of claim 3, wherein the statistical hypothesis test is a T-test.

5. The method of claim 1, wherein determining the set of similarity scores comprises:
determining a first distribution of the feature values for the data in fields in the first subset that are in one of the first columns;
determining a second distribution of the feature values for the data in fields in the second subset that are in one of the second columns;
comparing the first distribution with the second distribution; and
determining a similarity score based on the comparison of the first distribution with the second distribution.

6. The method of claim 1, comprising using the selected first subset of records from the first data table and the selected second subset of records from the second data table to evaluate similarity of each of the columns of the first data table with respect to each of the columns of the second data table.

7. The method of claim 1, wherein determining the set of similarity scores for each of the pairs of columns comprises:
determining, for each of the pairs of columns, a probability value for each feature type, each probability value being based on a different pair of feature vectors, wherein both feature vectors in each of the pairs of feature vectors comprise feature values for the same feature type.

8. The method of claim 7, wherein determining the probability value for each feature type comprises performing a statistical hypothesis test for a pair of feature vectors corresponding to the same feature type.

9. The method of claim 7, wherein determining a probability value for each feature type comprises:
determining a magnitude of a difference between the feature vectors in a pair of feature vectors corresponding to the same feature type; and
comparing the magnitude with a threshold.

10. The method of claim 1, comprising introducing randomness to feature values in at least one of the first feature vectors or at least one of the second feature vectors.

11. A system comprising:
one or more computers; and
one or more computer-readable media storing instructions that, when executed by the one or more computers, cause the one or more computers to perform operations comprising:
identifying, by the one or more computers, a first data table and a second data table, wherein the first data table comprises first columns, and wherein the second data table comprises second columns;
selecting, by the one or more computers, a first subset of records from the first data table and a second subset of records from the second data table;
for each of the first columns, generating, by the one or more computers, a set of first feature vectors comprising a first feature vector for each of multiple feature types, wherein each of the first feature vectors comprises a feature value for each of the records in the first subset of records;
for each of the second columns, generating, by the one or more computers, a set of second feature vectors comprising a second feature vector for each of the multiple feature types, wherein each of the second feature vectors comprises a feature value for each of the records in the second subset of records;
based on the sets of first feature vectors and the sets of second feature vectors, determining, by the one or more computers, a set of similarity scores for each of multiple pairs of columns, the set of similarity scores for each pair of columns comprising a similarity score for each of the multiple feature types, wherein each of the multiple pairs of columns comprises one of the first columns and one of the second columns;
for each of the multiple pairs of columns, evaluating, by the one or more computers, whether one or more of the similarity scores for the pair of columns indicate at least a minimum threshold level of similarity between first column in the pair and the second column in the pair of columns; and
selectively joining, by the one or more computers, the pairs of columns based on whether the similarity scores for the pairs of columns are determined to indicate at least the minimum threshold level of similarity.

12. The system of claim 11, wherein, in at least one of the first feature vectors and in at least one of the second feature vectors, the feature values are each determined for a different field and the feature value for each field is based on at least one of:
- a length of data in the field;
- a number of numeric digits in the field;
- a number of alphabetic characters in the field; or
- a number of characters in the field that are non-numeric and non-alphabetic.

13. The system of claim 11, wherein determining the set of similarity scores comprises:
- determining a first distribution of the feature values for the data in fields in the first subset that are in one of the first columns;
- determining a second distribution of the feature values for the data in fields in the second subset that are in one of the second columns;
- comparing the first distribution with the second distribution; and
- determining a similarity score based on the comparison of the first distribution with the second distribution.

14. The system of claim 11, wherein the operations comprise using the selected first subset of records from the first data table and the selected second subset of records from the second data table to evaluate similarity of each of the columns of the first data table with respect to each of the columns of the second data table.

15. One or more non-transitory computer-readable media storing instructions that, when executed by one or more computers, cause the one or more computers to perform operations comprising:
- identifying, by the one or more computers, a first data table and a second data table wherein the first data table comprises first columns, and wherein the second data table comprises second columns;
- selecting, by the one or more computers, a first subset of records from the first data table and a second subset of records from the second data table;
- for each of the first columns, generating, by the one or more computers, a set of first feature vectors comprising a first feature vector for each of multiple feature types, wherein each of the first feature vectors comprises a feature value for each of the records in the first subset of records;
- for each of the second columns, generating, by the one or more computers, a set of second feature vectors comprising a second feature vector for each of the multiple feature types, wherein each of the second feature vectors comprises a feature value for each of the records in the second subset of records;
- based on the sets of first feature vectors and the sets of second feature vectors, determining, by the one or more computers, a set of similarity scores for each of multiple pairs of columns, the set of similarity scores for each pair of columns comprising a similarity score for each of the multiple feature types, wherein each of the multiple pairs of columns comprises one of the first columns and one of the second columns;
- for each of the multiple pairs of columns, evaluating, by the one or more computers, whether one or more of the similarity scores for the pair of columns indicate at least a minimum threshold level of similarity between first column in the pair and the second column in the pair of columns; and
- selectively joining, by the one or more computers, the pairs of columns based on whether the similarity scores for the pairs of columns are determined to indicate at least the minimum threshold level of similarity.

16. The one or more non-transitory computer-readable media of claim 15, wherein, in at least one of the first feature vectors and in at least one of the second feature vectors, the feature values are each determined for a different field and the feature value for each field is based on at least one of:
- a length of data in the field;
- a number of numeric digits in the field;
- a number of alphabetic characters in the field; or
- a number of characters in the field that are non-numeric and non-alphabetic.

17. The one or more non-transitory computer-readable media of claim 15, wherein determining the set of similarity scores comprises:
- determining a first distribution of the feature values for the data in fields in the first subset that are in one of the first columns;
- determining a second distribution of the feature values for the data in fields in the second subset that are in one of the second columns;
- comparing the first distribution with the second distribution; and
- determining a similarity score based on the comparison of the first distribution with the second distribution.

18. The one or more non-transitory computer-readable media of claim 15, wherein the operations comprise using the selected first subset of records from the first data table and the selected second subset of records from the second data table to evaluate similarity of each of the columns of the first data table with respect to each of the columns of the second data table.

* * * * *

UNITED STATES PATENT AND TRADEMARK OFFICE
CERTIFICATE OF CORRECTION

PATENT NO. : 11,604,797 B2
APPLICATION NO. : 16/684572
DATED : March 14, 2023
INVENTOR(S) : Nannan Yu, Mohamed Diakite Pineda and Ren-Jay Huang Page 1 of 1

It is certified that error appears in the above-identified patent and that said Letters Patent is hereby corrected as shown below:

In the Claims

Claim 2, Column 23, Line 33, before "of" insert -- a number --.

Claim 15, Column 25, Line 32, delete "table wherein" and insert -- table, wherein --.

Signed and Sealed this
Twenty-fifth Day of April, 2023

Katherine Kelly Vidal
*Director of the United States Patent and Trademark Office*